D. VECCHINI.
THE EXTRACTION OF RUBBER.
APPLICATION FILED APR. 17, 1914.
1,159,137.
Patented Nov. 2, 1915.
2 SHEETS—SHEET 2.
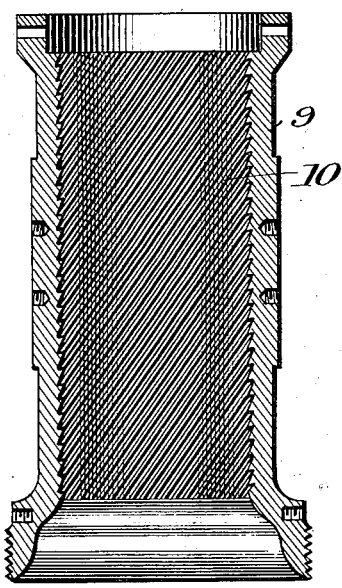
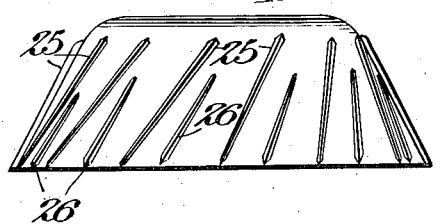
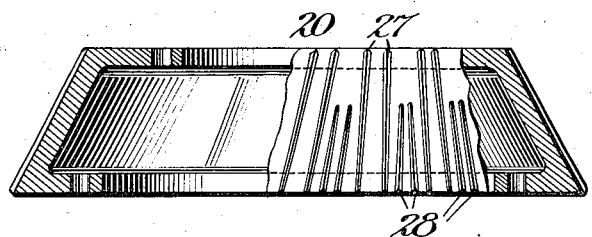
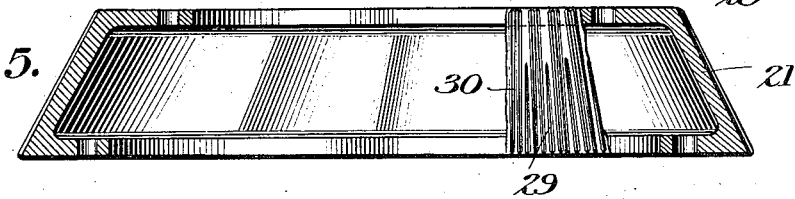
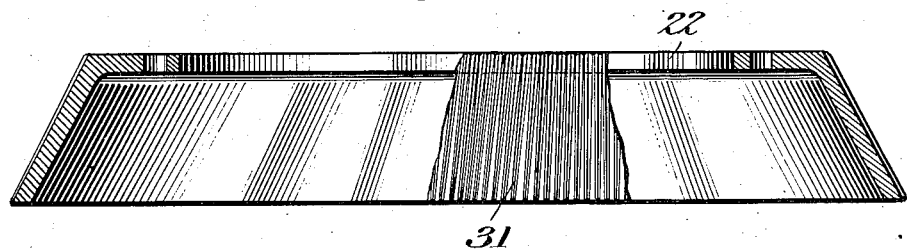

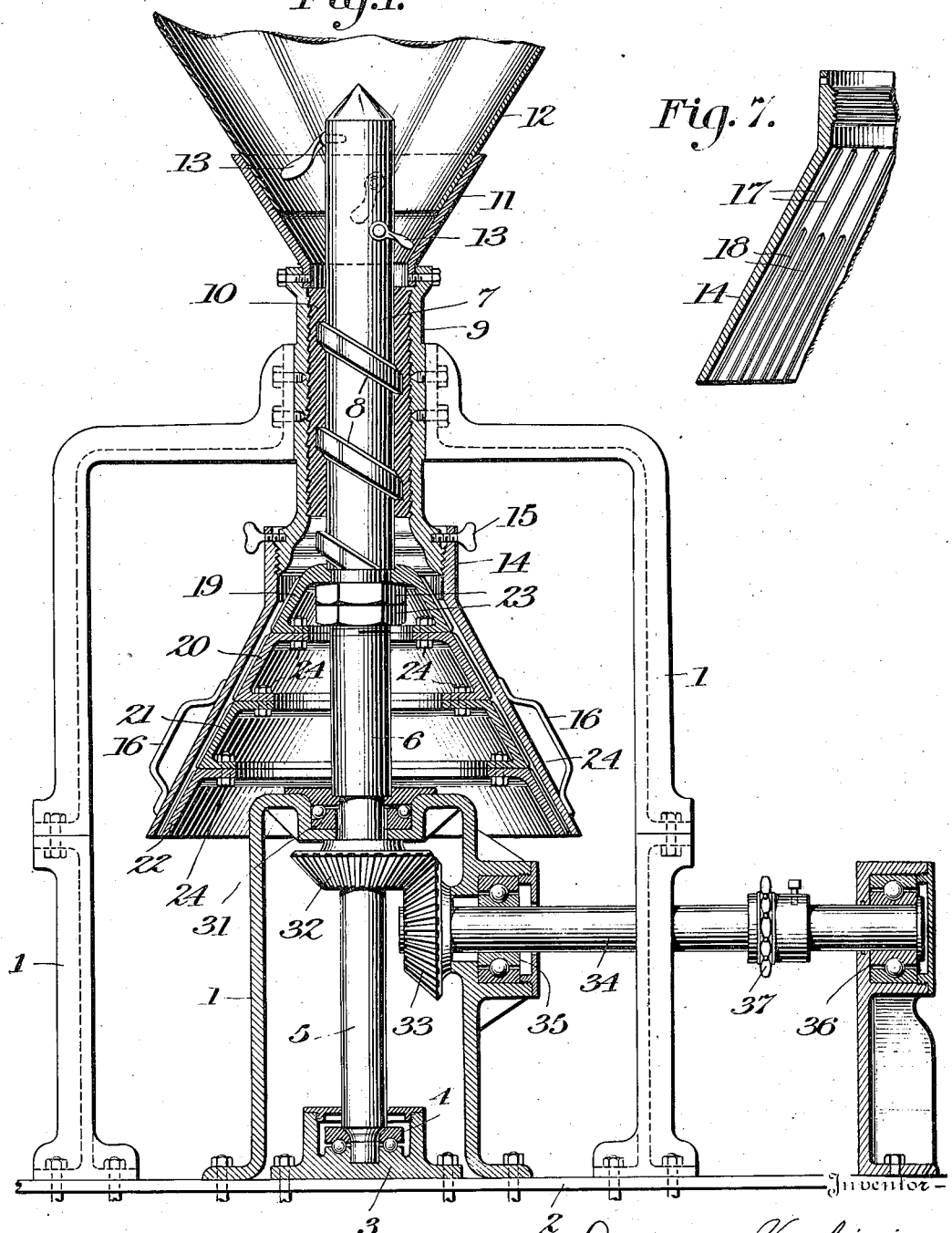

UNITED STATES PATENT OFFICE.

DOMINIQUE VECCHINI, OF NEW YORK, N. Y., ASSIGNOR, BY MESNE ASSIGNMENTS, TO FRANCO-AMERICAN RUBBER COMPANY, OF WILMINGTON, DELAWARE.

EXTRACTION OF RUBBER.

1,159,137.     Specification of Letters Patent.     Patented Nov. 2, 1915.

Application filed April 17, 1914. Serial No. 832,670.

*To all whom it may concern:*

Be it known that I, DOMINIQUE VECCHINI, a citizen of the Republic of France, residing at New York city, in the State of New York, have invented certain new and useful Improvements in the Extraction of Rubber; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to the extraction and withdrawal of rubber from rubber-bearing plants or rubber-like bearing plants.

All processes now in existence for the extraction of rubber from guayule shrubs are based on the principle of crushing and pulverizing the shrubs so as to obtain the separation of the rubber by flotation.

There are a great number of rubber plants wherein the rubber is in the form of filaments, and not vesicles, as in the guayule shrubs. If the guayule process is applied to such rubber plants it is impossible to obtain the rubber, because the crushing and cutting will necessarily reduce the filaments of rubber to such a state as to make it impossible to agglomerate them. I have discovered that the fibers composing the bark of such plants have great density, and the smallest quantity enveloping the rubber will prevent the flotation of the rubber, and, therefore, the known process of separating the rubber by flotation, as in the guayule shrubs, is not applicable to this kind of rubber plants or shrubs. My process, which is very much unlike the guayule one, is that of welding the rubber filaments together by pressure and friction and the heat naturally developed by the operation, thereby avoiding absolutely the crushing and cutting of said filaments.

In none of the comminuting processes heretofore practised has it been possible to obtain a separation of the rubber by comminution only. I have discovered that if the plants be dried, the rubber filaments will not shrink to any appreciable degree, and will retain sufficient plasticity to enable them to gather together, which fact may be taken advantage of in a dry separating process, to separate and agglomerate the filaments. Water, steam or other fluids will wet the surfaces of the rubber filaments and prevent their agglomeration.

The process as employed by me is a trituration by friction, preferably in successive stages, and to such a degree finally, that all the wood fiber and bark substances are reduced to a flour, while the rubber filaments, which are elastic, will not be rubbed asunder, but, on the contrary, will agglomerate into masses of considerable size, (lumps). The resulting, triturated product, is then thrown onto a suitable screen for separating the lumps from the dust.

One form of machine for carrying out my triturating process is shown in the accompanying drawings, in which—

Figure 1 is a vertical section, partly in elevation; Fig. 2 is a detail view of the outer triturating element for the first stage; Figs. 3, 4, 5 and 6 are views illustrating, respectively, the inner triturating elements for the second, third, fourth and fifth stages, and Fig. 7 is a detail view of a portion of the outer triturating element that coöperates with the elements illustrated in Figs. 3, 4, 5 and 6.

The machine comprises a frame 1, having a cast iron bed-plate 2, on which is secured a step or bearing 3, containing a ball thrust-bearing 4 for the reduced end 5 of the grinding shaft 6, the upper end 7 of which is provided with one or more triturating helices or spirals 8. Whether one or more triturating helices 8 are used will depend, in general, upon the average size of the shrubs; for small shrubs a number of such spirals may be formed on the shaft. There may be several such shafts, 5, 6, 7, each having a different number of triturating elements, at hand for mounting in the machine, as occasion may require.

The frame 1 supports a sleeve-like triturating element 9, for coöperation with the element 8, and is provided on its inner surface with helical grooves 10. A hopper 11 is secured to element 9 and has a sheet-iron extension 12. The upper end of shaft portion 7 projects into the hopper 11 and extension 12, and has blades 13 secured thereto for feeding the shrubs between the triturating surfaces 8 and 10.

On the lower end of the triturating element 9 is screwed the conical triturating element 14 provided with locking screws 15 and handles 16 to assist in mounting it. The inner face of this element is provided with long ribs 17, Fig. 7, alternating with short ribs 18.

Coöperating with cone 14 are four connected truncated elements, 19, 20, 21 and 22, arranged to form a single cone, the upper, smaller, element 19 being held on shaft portion 6 by nuts 23, the truncated cones being bolted together by bolts 24. The smallest element, 19, Fig. 3, is provided with long and short ribs 25 and 26 spaced wider apart, the two following elements, 20 and 21, Figs. 4 and 5, have similar ribs, 27, 28, 29 and 30, respectively, spaced closer together, while the last element 22, Fig. 6, has only long ribs diverging toward their lower ends.

The shaft portion 6 is provided with a ball bearing 31, and below it, in the portion 5, is a miter-gear 32 driven by a miter-gear 33 on a driving shaft 34, mounted in ball-bearings 35 and 36. The driving shaft 34 carries a sprocket 37 for driving an elevator, should one be desired to carry the shrubs to the hopper.

It should be noted that none of the triturating ribs have sharp edges, as a shearing or cutting action is to be avoided, and trituration only effected by the co-acting ribbed surfaces.

The shrubs, or only the barks, if desired, are preferably subjected to a preliminary crushing between two cylinders, rotating at the same speed. This operation has the effect of crushing, without cutting, and welding the rubber filaments between them, and in so doing raises to a considerable degree the facility of extracting the rubber, by crushing the inner stratum of the barks. The material is then fed into the hopper extension 12 and is moved by blades 13 to the screw surfaces 8 and 10. The material is sufficiently triturated between these surfaces to feed between cones 14 and 19, 20, 21 and 22, issuing from the lower cone 22 as a flour with which the agglomerated rubber is mixed. The heat developed in the triturating operation assists the agglomeration of the rubber.

As stated above, the process is a dry process, and the mixed product of the triturating operation is separated by screening.

The extremely fine, powdered bark material, separated from the rubber may be treated for the extraction of the tannin. This is not possible by the wet processes because the tannic acid is soluble in water.

I claim—

1. The method of separating rubber from rubber bearing plants, which comprises triturating the shrubs or barks, while avoiding the grinding and breaking of the rubber, at successively increasing speeds and to successively increasing fineness, the triturating speeds being sufficient to frictionally heat the rubber to agglomerating temperature.

2. The method of separating rubber from rubber bearing plants, which comprises subjecting the shrubs or barks to trituration gradually increasing in both speed of trituration and fineness of material, the speed of trituration being sufficient to heat the rubber to agglomerating temperature, the heat increasing with the speed and the fineness of the material.

3. The method of separating rubber from rubber bearing shrubs or barks, which comprises heating the rubber filaments by subjecting the shrubs or barks to friction, simultaneously pressing the heated filaments to weld the latter together and comminute the remaining portion without crushing or cutting said filaments, separating the welded filaments from the comminuted particles by screening, and extracting the tannin from the comminuted particles.

4. The method of separating rubber from rubber bearing plants and barks in which the rubber occurs in filamentous form, which comprises subjecting the dried shrubs or barks to a triturating or rubbing action between suitable rotating surfaces without breaking or tearing the rubber filaments, and at different speeds sufficient to gradually frictionally heat the filaments to agglomerating condition, and separating the resulting rubber and powder.

5. The method of separating rubber from rubber bearing plants, which comprises subjecting the shrubs or barks to trituration between triturating surfaces, the triturating speed and fineness of the material gradually increasing, the layer of material being triturated between said surfaces decreasing in thickness with the increase in speed and fineness, said speed, fineness of grinding and thickness of material between the surfaces proportioned to maintain a frictional heat sufficient to agglomerate the rubber.

6. The method of extracting rubber which consists in drying rubber bearing shrubs or barks, crushing without grinding, the dried shrubs or barks, subjecting the crushed material to friction, thereby heating the rubber filaments, simultaneously subjecting the crushed material to pressure to weld the rubber filaments together and comminute the remaining portion of the crushed material, separating by screening in a dry state the welded filaments and comminuted material, and extracting the tannin from the separated comminuted particles.

In testimony that I claim the foregoing as my invention, I have signed my name in presence of two subscribing witnesses.

DOMINIQUE VECCHINI.

Witnesses:
ABRAHAM N. LEVY,
JACOB GEACUS.